Oct. 1, 1957 H. E. HAYNES 2,808,453

COLOR CORRECTION SYSTEMS

Filed June 1, 1953 2 Sheets-Sheet 1

INVENTOR.
HAROLD E. HAYNES

BY Morris A. Rabkin

ATTORNEY

Oct. 1, 1957 H. E. HAYNES 2,808,453

COLOR CORRECTION SYSTEMS

Filed June 1, 1953 2 Sheets-Sheet 2

INVENTOR.
HAROLD E. HAYNES

BY Morris A. Rabin

ATTORNEY 2,808,453
Patented Oct. 1, 1957

2,808,453

COLOR CORRECTION SYSTEMS

Harold E. Haynes, Haddonfield, N. J., assignor to Radio Corporation of America, a corporation of Delaware Application June 1, 1953, Serial No. 358,643

21 Claims. (Cl. 178—5.2)

Figure 1:
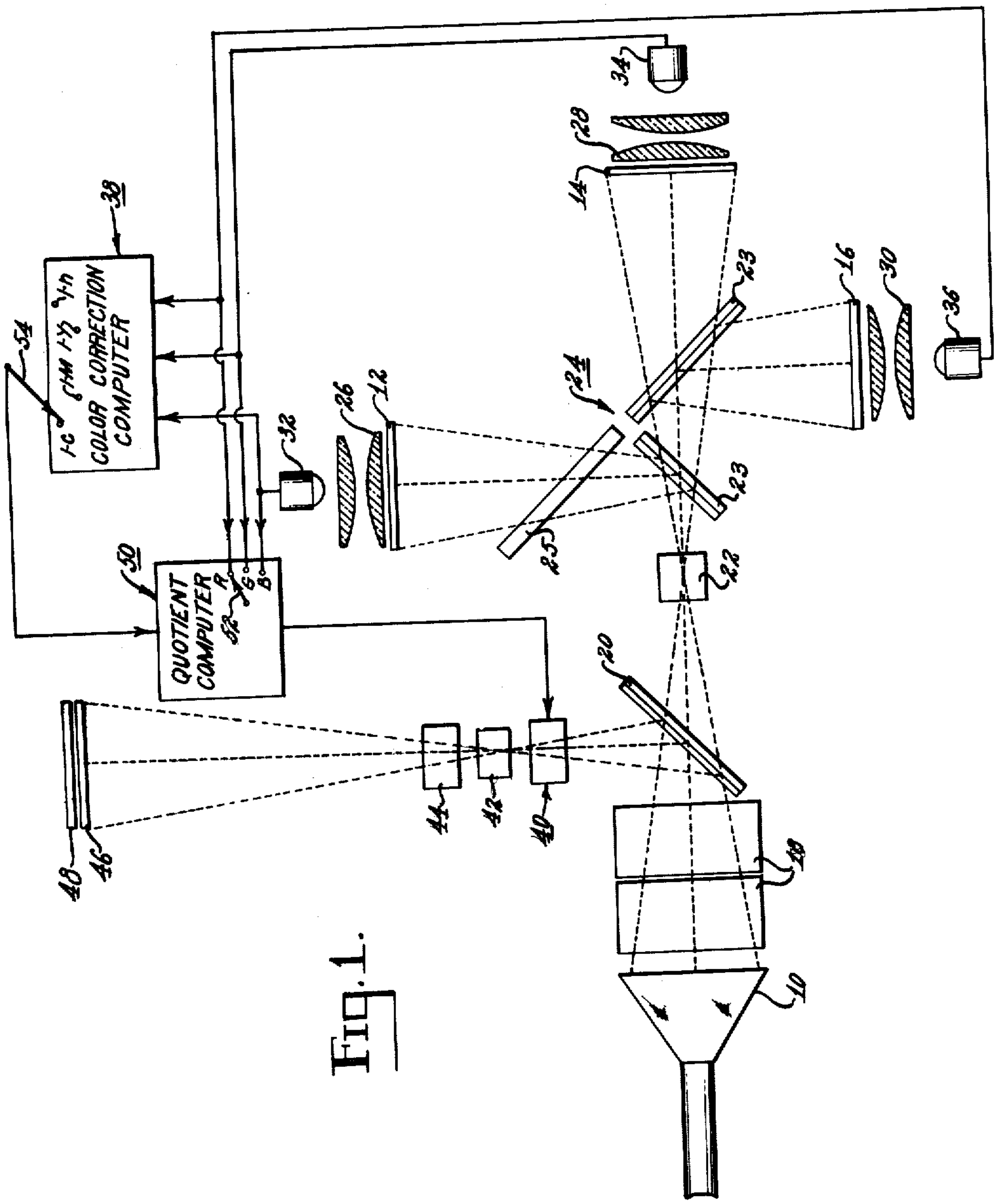

This invention relates to systems for making color corrected separation records from uncorrected color separation records and more particularly to an improvement in the scanning and exposing systems employed therein.

In an article in the "Journal of the Optical Society of America," volume 38, Number 4, April 1948, entitled "Color correction in color printing" by Arthur C. Hardy and F. L. Wurzburg, Jr., there is described a system for obtaining color corrected negatives from color separation positives. Color separation negatives are made by photographing a subject through a red filter, a green filter, and a blue filter. These three negatives are then used to provide three photographic positives which are monochrome representations of the tristimulus values of the original subject. The color separation negatives cannot be directly used for making printing plates for truly reproducing the original subject without some corrections being made. The color characteristics of the printing inks to be used as well as the color of the paper on which the print is to be made are some of the factors for which allowances must be made. The article above mentioned describes a system wherein the three color separation positives are scanned simultaneously to provide three electrical signals. These three signals are then applied to a computer which computes the required corrections and then provides, as an output, three corrected electrical signals. Each of these signals in turn is used to control the intensity of a light to which a sensitized photographic plate is exposed. The mechanism in Figure 1 of the article shows that the three separation positives are scanned simultaneously while a sensitized photographic plate is exposed to the controlled light. A line by line scan is used and this complete scan is repeated three times while exposing three separate photographic plates and is done four times where a four color process is desired. Of course, each time a scan is made a different corrected output signal controls the exposure light. The resultant photographic plates are color corrected and may be used for making printing plates.

The scanning and exposing system used with this color correction apparatus is a mechanical one. To eliminate the limitations and disadvantages of a mechanical system an electronic one has been proposed. A cathode ray tube providing an intense spot of light which is movable and is commonly known as as a "flying spot scanner" is used as a scanning light source and a second cathode ray tube, which has the intensity of its electron beam controlled by one of the output signals from the color correction computer, is used as the exposure light source. The scanner cathode ray tube provides a spot of light on its screen which, by means of a beam splitting arrangement, is split into three parts. Each of these three light beams is focussed on a corresponding spot on each of the three separation positives. The light transmitted through each positive is converted into an electrical signal by a photocell and these electrical signals are applied to the color correction computer. The scanning cathode ray beam and the exposure cathode ray beam are deflected together so that, while the three color separation positives are being scanned, a color corrected photographic plate is being exposed.

It is seen that with this scanning and exposing system the photographic quality of the color-corrected photographic plates is limited by the size of the scanning light spot. The photographic quality of the original color separations is based on variations in brightness in each of the small spots that are scanned. However, the corresponding images have a uniform brightness. Thus, there is some loss in resolution inherent in this system due to the finite size of the scanning spot. Furthermore, the loss of image detail in the color-corrected plates occurs even when there is little or no color correction required.

In order to reduce this loss of resolution to a minimum, very exacting requirements must be placed on the cathode ray tubes. The resolution desired for an acceptable picture is at least 2,000 lines overall with at least 5 million elements in a 4 x 5 picture. Accordingly, a picture element is of the order of 0.002 of an inch, which is the size of the scanning light spot. It is difficult to produce a cathode ray tube that provides such a small scanning spot. Furthermore, better quality pictures may require that the scanning spot more closely approach a point source of light. Consequently, with this system, improvements in the quality of the color-corrected images are somewhat circumscribed by the size of the scanning spot that can be achieved.

Accordingly, it is an object of this invention to provide a new and improved scanning and exposing system for a color-correction system of the type described.

Another object of this invention is to provide a simple scanning and exposing system for a color-correction system that produces an improved picture quality in the color corrected images.

Still another object of this invention is to provide a new method of producing color-corrected images that is not limited in the resolution achieved by the size of the scanning light spot.

Yet another object of this invention is to provide new and simple scanning and exposing apparatus for a color-correction system that provides increased resolution in the color-corrected images.

A feature of this invention is the retention of the picture quality of the original color separations by exposing each of the color-corrected images through an uncorrected color separation.

Another feature of this invention is the provision of a feedback control system in which the intensity of the light exposing the color-corrected image is determined and compared with the light intensity required by the color-corrected signals, and the intensity of the exposure light is varied to correct for differences.

Still another feature of this invention is the use of a light source for the scanning of the uncorrected color separations, and the same light source and a light modulator for exposing the color-corrected images.

The above and other objects of this invention are achieved in a color correction system of the type described that is modified by arranging for the recording or exposure of the color-corrected images through uncorrected color separations that may be duplicates of those used for scanning. The intensity of the exposure light applied to each uncorrected color separation is made to be proportional to the ratio of the associated color corrected signals to the light transmission of the uncorrected color separation. The transmission of the exposure color separation and the exposure light intensity then multiply to give a net exposure light proportional to the color corrected signals. Thus the exposed image is color-corrected as in the present system. In addition, some of the photographic quality of the uncorrected color separation is transferred directly to the corrected image, by-passing the electronic scanning system.

In one embodiment of this invention, signals proportional to the desired ratio for controlling the light intensity are provided by a quotient computer in addition to the present color-correction computer. In another embodiment of this invention, signals proportional to the desired ratio are provided by a feedback system. The exposure light passing through the uncorrected color separation is converted to representative electrical signals and compared with the color-corrected signals. The intensity of the exposure light is automatically adjusted to reduce any difference between the two sets of signals to zero.

In the preferred embodiments of this invention, a single cathode ray tube is used to provide the light source for both the scanning and recording operations. A signal-responsive light modulator is used to control the intensity of the exposing light in accordance with the color-correction signals.

Figure 2:
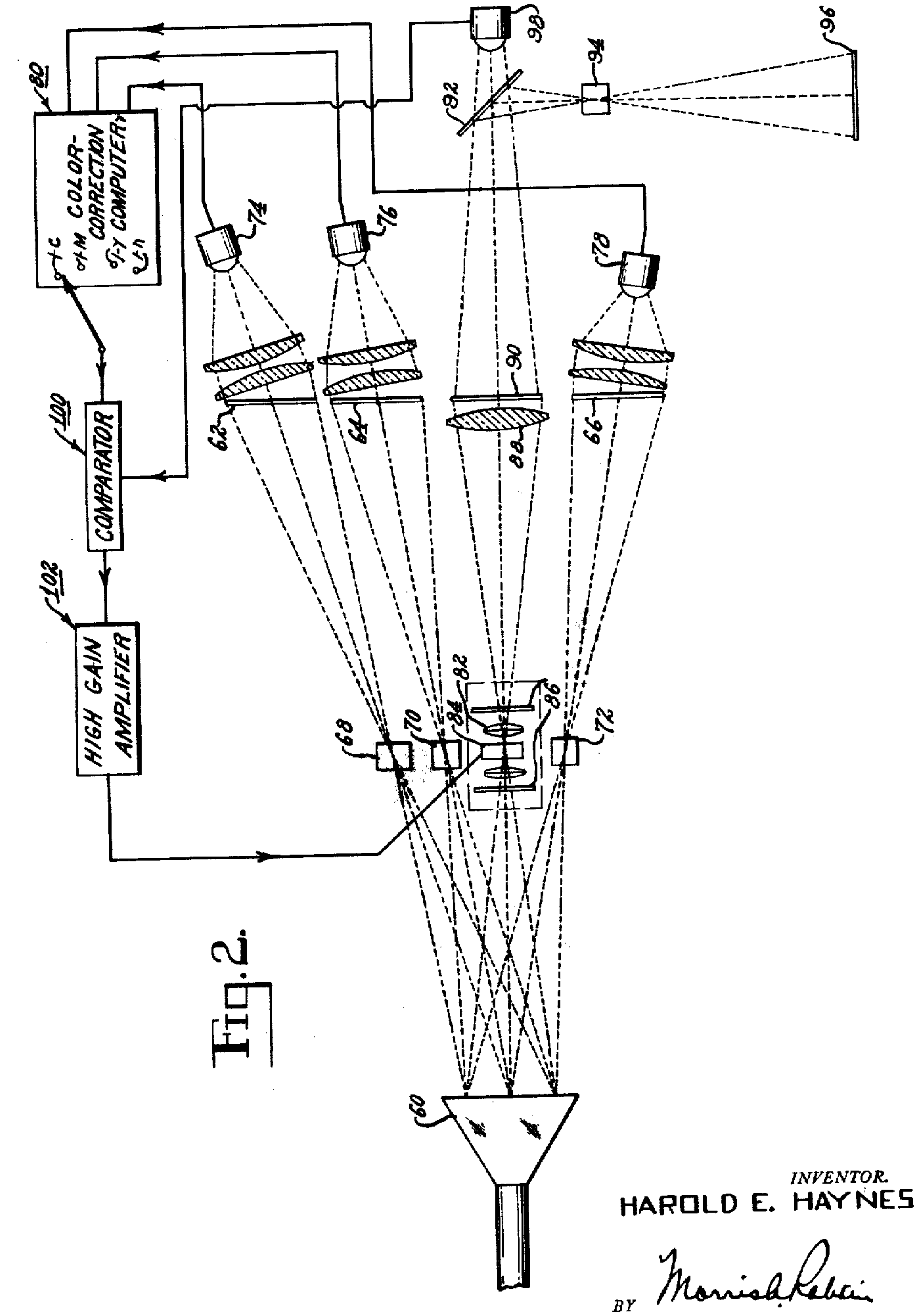

The novel features of this invention as well as the invention itself, both as to its organization and mode of operation, may be better understood from the following description when read together with the accompanying drawings in which:

Figure 1 is a schematic diagram of a color-correction system incorporating an embodiment of this invention; and Figure 2 is a schematic diagram of a color-correction system incorporating another embodiment of this invention.

Referring now to Figure 1 of the drawing, there is shown a schematic diagram of a color-correction system incorporating an embodiment of this invention. A flying spot tube 10, in the form of a cathode ray tube providing a spot of light having a high lumen content is used to scan three transparencies 12, 14, 16, which are uncorrected color separation positives. These color separation positives may be prepared from negatives that are exposed through red, green and blue filters. The invention is not restricted to any particular form of color separations. The flying spot tube may be of the type described in an article in "Electronics," June 1948, page 124, entitled "The flying spot video generator."

The optical paths from the screen of the flying spot tube 10 are through a set of astigmatism-compensating plates 18, a first partially-transmitting mirror 20, an imaging lens 22, and then through a mirror beam splitter 24 to the uncorrected color separations 12, 14, 16. The beam splitter 24 is made up of two partially-transmitting mirrors 23, and a flat compensating plate 25 to insure identical optical paths to the three color separations.

The color separation positives 12, 14, 16 are oriented so that the three light beams produced by the beam splitter 24 simultaneously strike corresponding areas on each color separation. The light passing through each color separation is concentrated by a condenser lens 26, 28, 30 and directed on to an associated phototube 32, 34, 36. The phototubes convert the light variations into electrical signal variations. These three sets of electrical signals are applied to the inputs of a color-correction computer 38 which may be of the type described in U. S. Patent No. 2,434,561 to Hardy et al. The computer 38 computes the corrections for these signals that are required to produce a corrected color separation. Three of the computer outputs correspond to corrected electrical signals for cyan, magenta and yellow. For the purposes of this embodiment of the invention the reversed color corrected signals, also available from the computer, are used; namely, $1-c$, $1-m$ and $1-y$. Where a fourth color-corrected plate is desired, namely a black plate, the reverse of the corrected black output is also used, which is $1-n$.

The flying spot scanner 10 used for scanning the uncorrected color separations is also used as the light source for recording or exposing the color-corrected negative. The optical path for the exposing light spot is from the first partially transmitting mirror 20, which diverts a portion of the scanning light, through a light modulator 40, an imaging lens 42, an astigmatism-compensating plate 44 where needed, and an uncorrected color separation 46 to a sensitive plate 48. The astigmatism in the exposing and scanning optical paths is made identical. The light modulator 40 may be any device capable of rapid modulation (a few thousand cycles per second for present requirements) under the influence of an appropriate electrical signal. One type of light modulator is the Kerr cell having crossed polarizers. Another type of modulator utilizes an electro-optical crystal known as the "P" type and is described in articles "Light modulation by P-type crystals," by G. D. Gottschall, and "Sound-on-film recording using electrooptic crystal techniques" by R. A. Dressler et al. in the Journal of the Society of Motion Picture Engineers, July 1948 and March 1953. This crystal material, under the influence of an electric field applied parallel to the optical axis, rotates the plane of polarization of polarized light that is transmitted. The faces of the crystal are coated with a transparent but electrically-conducting layer. The rotation of the plane of polarization and, thus, the intensity of light transmitted through fixed polarizers is a function of the applied voltage. The signals applied to the light modulator 40 are produced by a quotient computer 50. This quotient computer 50 has as its inputs one of the sets of uncorrected signals from the phototubes 32, 34, 36, which may be selected by a switch 52, and a corresponding one of the sets of color-corrected signals from the color-correction computer 38, also selected by a switch 54. One form of quotient computer that may be used is the crossed-fields multiplier as modified for division. This is described in an article "An electronic differential analyzer" by A. B. Macnee in Proceedings of the I. R. E., November 1949. The quotient computer 50 is arranged to produce an electrical signal proportional to the ratio of the selected output signals from the color-correction computer 38 to the corresponding uncorrected phototube outputs.

A duplicate of one of the uncorrected color separations 12, 14, 16 is mounted in front of and in contact with the sensitive plate 48 to be exposed. This duplicate separation 46 is positioned so that the exposing light spot strikes the area corresponding to the color separation areas being scanned. As an example, the red color separation may be considered. The switch 52 of the quotient computer 50 is set to receive the uncorrected red signals, and the corresponding selected output of the color-correction computer 38 is $1-c$ since this varies in the same direction as the red signals. The output of the quotient computer 50 is then proportional to the ratio of the corrected to the uncorrected signals. Therefore, the intensity of the exposing light transmitted by the light modulator 40 is also proportional to this ratio. The transmission of the uncorrected separation 46 at each point and the intensity of the exposing light at the point multiply to give the net exposure. Hence, the light reaching the sensitive emulsion plate 48 is proportional to the color corrected signal $1-c$, so that a corrected cyan color separation is exposed. In a similar manner, corrected magenta and yellow color separations are respectively produced in accordance with the color-corrected signals $1-m$ and $1-y$ by exposure through green and blue duplicate uncorrected separations and by modulating the exposure light in proportion to the corresponding ratios. These color-corrected separations are then used to produce half-tone printing plates by known methods.

The color-corrected image falling on the sensitive plate 48 is an optical image of the duplicate uncorrected color separation 46. Therefore, the photographic quality or resolution of this color-corrected image is high especially where there is little or no color correction required. The scanning and computer process, in effect, supplies only the corrections that are needed and not the whole image structure. If no correction is needed, the intensity of the exposing light remains constant over the whole picture, and no image detail is lost, regardless of the size of the scanning spot. Under such circumstances the cathode ray tube 10 is merely an illuminator for the exposure process. Since the image detail is largely transferred directly by the exposure process, and the scanning spot does not have to supply it, the stringent requirement in the cathode ray tube of an extremely small light spot is relieved. In fact, deliberate spot enlargement may be desirable in some cases. This may be seen by considering the effect of the color-correction signals on the exposure as that of a color-corrected "mask." The effect of an enlarged scanning spot in terms of the color correction is that of "unsharp masking," which is recommended for color correction in the graphic arts.

None of the uncorrected color separations 12, 14, 16 tend to control a black plate directly. However, a black color-corrected plate may be exposed by using a duplicate of one of the uncorrected color separations as the exposure color separation 46. The green uncorrected color separation may give the closest approach to the black plate image detail. In that case, exposure is through a green separation, and the light intensity is modulated in accordance with the ratio of the black color-corrected signals $1-n$ to the green uncorrected signals. The sensitized plate is, thus, exposed in accordance with the black correction-signals, the uncorrected green cancelling out, and the image detail contains much of the actual black image.

Alternatively, a "black" uncorrected plate may be made for the exposure process. This may be done by exposing a separation through all three of the usual red, green and blue filters for different times giving a composite exposure $K_R R+K_G+K_B B$, where the constants $K_R$, $K_G$, $K_B$ depend on the time of exposure through the corresponding filters, and R, G and B are the light transmissions for the corresponding colors. Actually, this is a "white" color separation since it is the product of an additive exposure. The black color-corrected plate is then made by exposing through this "white" separation and modulating the light intensity in accordance with the ratio of the reversed black color-corrected signals $1-n$ to signals proportional to the composite uncorrected transmission $$K_R R+K_G G+K_B B$$

A simple computer such as a resistance network (not shown) may be used to produce signals proportional to the light transmission through the composite exposure from the uncorrected phototube outputs and apply them to the quotient computer 50.

In Figure 2, there is shown another embodiment of this invention that employs an optical scanning system described in the patent application Serial No. 326,750 of K. E. Andrews, U. S. Patent No. 2,740,832.

A flying spot tube 60 is again employed. A separate optical path is provided for directing the scanning spot from the tube 60 to corresponding areas of each of the three uncorrected color separation transparencies 62, 64, 66. Each scanning optical path is made up of an imaging lens 68, 70, 72 mounted approximately midway between the screen of the flying spot tube and the plane of the associated color separation 62, 64, 66. The light through the uncorrected color separations is concentrated by separate condenser lenses onto phototubes 74, 76, 78, and the outputs of these phototubes are applied to a color-correction computer 80, in the manner described above. The imaging lenses 68, 70, 72 are substantially identical and of the symmetrical type. When operated under a condition of unit magnification, a symmetrical lens is automatically corrected for distortion and is free from coma and transverse chromatic aberration. Symmetrical lenses having flat fields are used, in order that they may be positioned in parallel planes and the color separations may also be positioned in parallel planes.

The flying spot tube 60 is also used for recording or exposing the color corrected negative. The exposing optical path includes another imaging lens 82, that is the same as those in the scanning optical paths, and a light modulator 84 employing a "P" type crystal, as described above. In front of and behind the symmetrical lens 82 there are provided polarizing devices 86 which are oriented to give the desired net transmission through the system with some specific applied voltage. For example, it might be desirable to have substantially zero transmission for zero voltage. In this case the polarizers 86 would be oriented at 90° to each other. The orientation used would depend on convenience in the electrical system. The imaging lens 82 in the exposure path is preferably situated coaxially with the flying spot tube 60 so that the field it covers extends off the axis of the lens as little as possible. The exposing light transmitted through the light modulator 84 passes through a field lens 88 and a duplicate 90 of one of the uncorrected color separations 62, 64, 66. A projection-exposure arrangement includes a partially transmitting mirror 92 that reflects the exposure light to an objective lens 94, which, in turn, images the duplicate color separation 90 onto a sensitive emulsion plate 96. The field lens 88 acts to image the symmetrical lens 82 at the objective lens 94. Such a field lens is well known in the optical art and may take any appropriate form. The light transmitted by the mirror 92 is directed to a phototube 98 by the converging action of the field lens. The output of the exposing-light phototube 98 is applied as an input to a comparator 100. The comparator 100 has as a second input, a selected one of the outputs of the color correction computer 80. The comparator compares the signals proportional to the exposing light with the corresponding ones from the color correction computer 80 and produces an output in accordance with the difference. One form of comparator circuit which may be used is shown in Figure 8 in the patent to A. C. Hardy et al., noted above. The comparator output is applied to a high gain amplifier 102 which in turn applies a control signal to the light modulator 84.

The comparator 100 detects the difference between the signals representing the desired corrected information and those representing the actual exposing light and produces an output voltage proportional to the difference. The comparator output is then amplified. The output of the amplifier 102 controls the light modulator 84 to vary the intensity of the exposing light in the direction minimizing the difference. Consequently, the phototube tube output approaches the color-corrected signals; the output of the comparator 100 approaches zero; and the exposing light received by the phototube 98 is proportional to the desired color corrected information. The light diverted by the partially transmitting mirror 92 to the objective lens 94 is, of course, proportional to that falling on the phototube 98. Therefore, the image falling on the sensitive plate 96 is color corrected in accordance with the output of the color-correction computer 80. The output of the exposing-light phototube 98 is, at any instant, proportional to the product of the transmission of the duplicate color separation 90 at the point involved and the intensity of light transmitted by the light modulator 84; and it is made equal to the output of the color-correction computer 80 by the feedback action. Consequently, the exposing light transmitted by the light modulator 84 is proportional to the ratio of the color-correction output to the transmission of the duplicate color separation 90, similarly as in the embodiment of Figure 1.

The image falling on the sensitive plate 96 is an optical image of the duplicate color separation 90, and thus, the resolution of this image is retained in the same way as in the first described embodiment. The cyan, magenta and yellow color-corrected records may be made in this way, using duplicates of the scanned color separations 62, 64, 66 and the appropriate outputs of the color-correction computer 80. A black color-corrected plate may be similarly made using a duplicate uncorrected color separation, in the manner described above. A somewhat better approximation of the black image detail may be attained by exposing an uncorrected color separation through a fourth filter such as yellow, or by exposing a composite separation through all three filters as described above. There is no limitation on the character of the color separation through which the sensitive plate is exposed, except that the more closely it approaches the color-corrected image the less is the loss in resolution. It should be noted that even if no image at all is provided at the duplicate color separation 90, an accurate corrected plate would nevertheless be produced due to the feedback recording loop. However, in this case, only the resolution permitted by the cathode ray tube, the scanning system, and the computer response is obtained.

Thus, as in the first described embodiment of this invention a color corrected plate is produced that has high resolution. In addition, a feedback system provides a high degree of control over the intensity of the exposing light. The feedback action relieves all strict requirements in the formation of the duplicate color separation. Furthermore, the transfer function of the light modulator is of only secondary importance since it is also in the feedback loop.

This invention is not limited in its application to the described system of scanning uncorrected color separations. It may also be used with other systems for scanning an uncorrected colored subject and producing uncorrected electrical signals representative of three primary colors. Another type of scanning system that is applicable is described in the patent to Hall, No. 2,606,245.

As may be seen from the above description of this invention, an improved scanning and exposing system for color correction has been provided. With the method and apparatus of this invention, color-corrected images of improved picture quality are produced. Improved resolution in the color-corrected image may be achieved without the need for an extremely small scanning light spot.

What is claimed is:

1. In a system for obtaining color corrected records from a plurality of photographic color separations by means of color corrected signals, the method comprising the steps of simultaneously scanning successive corresponding areas of said color separations to obtain said color corrected signals in accordance with the light passing through said color separations, exposing areas of a light sensitive record element through the successive corresponding areas of another color separation simultaneously with said scanning step, and varying the intensity of the exposure light applied to said another color separation as a function of the ratio of said color corrected signals to the light transmission of said another color separation.

2. In a system for obtaining color corrected records from a plurality of photographic color separations by means of color corrected signals, the method comprising the steps of simultaneously scanning successive corresponding areas of said color separations to obtain said color corrected signals in accordance with the light transmission through said color separations, exposing a light sensitive record element through the corresponding areas of another color separation, determining the intensity of light passing through said another color separation, and varying the intensity of the exposure light to correct for departures of the intensity of light passing through said another color separation from the intensity required by said color corrected signals.

3. In a system for obtaining color corrected records from a plurality of photographic color separations by means of color corrected information computed in accordance with the characteristics of said color separations, the method comprising the steps of simultaneously scanning corresponding areas of said color separations to obtain said color corrected information, exposing a light sensitive record element through the corresponding areas of another color separation simultaneously with said scanning step, determining the intensity of exposure light applied to said record element, and varying the intensity of the exposure light to correct for departures of the intensity of applied exposure light from the intensity required by said color corrected information.

4. In a system for obtaining color corrected records from a plurality of photographic color separations, the combination of: means for simultaneously scanning successive corresponding areas of said color separations, means for producing color corrected signals in accordance with the light passing through said color separations, means for exposing a light sensitive record element through the successive corresponding areas of another color separation, and means for varying the intensity of the exposure light in proportion to the ratio of the associated corrected signals to the light transmission of said another color separation.

5. In a system for obtaining color corrected records from a plurality of photographic color separations, the combination as recited in claim 4 wherein said means for varying the intensity of the exposure light in proportion to said ratio includes a quotient computer.

6. In a system for obtaining color corrected records from a plurality of photographic color separation, the combination as recited in claim 4 wherein said means for varying the intensity of the exposure light in proportion to said ratio includes a feedback system.

7. In a system for obtaining color corrected records from a plurality of photographic color separations, the combination of: means for obtaining color corrected electrical signals in accordance with the effects of said color separations on a scanning light applied thereto, means for exposing a light sensitive record element through another color separation, means for converting the exposure light applied to said record element to representative electrical signals, and signal responsive means for varying the intensity of the exposure light in accordance with departures of said representative electrical signals from said color corrected electrical signals.

8. In a system for obtaining color corrected records from a plurality of photographic color separations, the combination of: means for obtaining color corrected electrical signals in accordance with the light passing through said color separations, means for simultaneously exposing a light sensitive record element through another color separation, means for converting the exposure light passing through said another color separation to representative electrical signals, and means for varying the intensity of the exposure light applied to said another color separation responsive to departures of said representative electrical signals from said color corrected electrical signals.

9. In a system for obtaining color corrected records from a plurality of photographic color separations, the combination of: means for obtaining color corrected electrical signals in accordance with the light transmission through said color separations, means for supporting a light sensitive record element and another color separation in exposure relationship, a light modulator, a light imaging system for directing a light spot passing through said light modulator to said another color separation and light sensitive record element, means for converting the light transmission through said additional color separation to representative electrical signals, means for producing control signals in accordance with the difference between said representative electrical signals and said color corrected signals, and amplifying for applying said control signals to said light modulator.

10. In a system for obtaining color corrected records from a plurality of photographic color separations, the combination of means for producing a light spot to successively scan an area, means for supporting a plurality of said color separations, means for supporting a light sensitive record element, a light modulator, a light imaging system for simultaneously directing said light spot to corresponding areas of said color separations and through said light modulator to said record element, means responsive to the light passing through said color separations for producing color corrected electrical signals, means for converting the light directed to said record element to representative electrical signals, means for producing control electrical signals in accordance with the difference between said color corrected and representative electrical signals, and high gain amplifying means for applying said control electrical signals to said light modulator.

11. In a system for obtaining color corrected records from a subject having color characteristics, the method comprising the steps of deriving color correction information in accordance with the color characteristics of said subject, exposing a light sensitive record element through a color separation of said subject, and varying the intensity of the exposure light in accordance with the ratio of said color correction information to the transmission of said color separation.

12. In a system for obtaining color corrected records from a subject in color, the combination of means for obtaining color corrected signals in accordance with the color characteristics of said subject, means for exposing a light sensitive record element through a transparency of said subject, means for converting the exposure light transmitted through said transparency to representative signals, and means for varying the exposure light applied to said transparency in accordance with both said color correction and said representative signals.

13. In a system for obtaining color corrected records from a subject having color characteristics, in which system color corrected electrical signals are derived in accordance with the color characteristics of successive areas of said subject, the combination of: means for directing a moving exposure light to areas of a light sensitive record element corresponding to said subject areas, means for deriving electrical signals representative of the exposure light directed to said record element, means for comparing said color corrected signals and said exposure light signals relating to corresponding areas of said subject and of said record element, and means for varying the intensity of the exposure light in accordance with departures of said exposure light signals from said color corrected signals.

14. In a system for obtaining color corrected records from a plurality of photographic color separations, the combination of: means for obtaining color corrected electrical signals in accordance with the effects of corresponding areas of said color separations on a scanning light applied thereto, means for directing an exposure light to areas of a light sensitive record element corresponding to said separation areas, means for converting the exposure light directed to said record element areas to representative electrical signals, and means for varying the intensity of said exposure light in accordance with departures of said representative electrical signals from said color corrected signals related to corresponding separation areas.

15. In a system for obtaining color corrected records from a subject having color characteristics, the combination of: means for scanning successive areas of said subject to obtain color corrected signals in accordance with the color characteristics of said subject, said scanning means including means for exposing corresponding areas of a light sensitive record element simultaneously with the scanning of said subject, and means for varying the intensity of the exposure light; means for deriving signals in accordance with the intensity of said exposure light; and means for applying signals to said exposure light varying means in accordance with the difference between said color corrected and said exposure light signals.

16. In a system for obtaining color corrected records from a subject having color characteristics, the combination of: means for supporting a light sensitive record element; means for obtaining color corrected electrical signals in accordance with the color characteristics of said subject, said signal obtaining means including scanning means for directing a moving light spot to said record element; means for deriving electrical signals in accordance with the light directed to said record element, and means for deriving signals in accordance with the difference between said color corrected and said record element signals and for applying said difference signals to said scanning means to vary the intensity of said light spot directed to said record element.

17. In a system for obtaining color corrected records from a subject having color characteristics, the combination of: means for supporting a light sensitive record element and a photographic transparency of said subject in an exposure relationship; means for obtaining color corrected electrical signals in accordance with the color characteristics of said subject, said signal obtaining means including means for directing a scanning light spot to corresponding areas of said subject, and of said transparency, and through said transparency to said record element and for modulating the light directed through said transparency to said record element; means for deriving electrical signals from the exposure light directed through said transparency to said record element; and means for deriving signals in accordance with the difference between said color corrected signals and said exposure light signals and for applying said difference signals to said light modulating means to control the modulation of said exposure light.

18. In a system for obtaining color corrected records from a subject having color characteristics, in which system color corrected electrical signals are derived in accordance with the color characteristics of successive areas of said subject, the combination of: means for directing a moving exposure light spot to areas of a light sensitive record element corresponding to said subject areas, means for deriving electrical signals representative of the exposure light directed to said record element, means for comparing said color corrected signals and said exposure light signals relating to corresponding areas of said subject and of said record element, and means for varying the amount of the exposure light in accordance with departures of said exposure light signals from said color corrected signals.

19. In a system for obtaining color corrected records from a plurality of photographic color separations, the combination of: means for obtaining color corrected electrical signals in accordance with the effects of corresponding areas of said color separations on a scanning light applied thereto, means for directing an exposure light to areas of a light sensitive record element corresponding to said separation areas, means for converting the exposure light directed to said record element areas to representative electrical signals, and means for varying the amount of said exposure light in accordance with departure of said representative electrical signals from said color corrected signals related to corresponding separation areas 20. In a system for obtaining color corrected records from a subject having color characteristics, the combination of: means for supporting a light sensitive record element; means for obtaining color corrected electrical signals in accordance with the color characteristics of said subject, said signal obtaining means including scanning means for directing a light spot to said subject and to said record element; means for deriving electrical signals in accordance with the light directed to said record element; and means for deriving signals in accordance with the difference between said color corrected and said record element signals and for applying said difference signals to said scanning means to vary the amount of light directed to said record element.

21. In a system for obtaining color corrected records from a subject having color characteristics, the combination of: means for supporting a light sensitive record element and a photographic transparency of said subject in an exposure relationship; means for obtaining color corrected electrical signals in accordance with the color characteristics of said subject, said signal obtaining means including means for directing a scanning light spot to corresponding areas of said subject, and of said transparency, and through said transparency to said record element and for modulating the light directed through said transparency to said record element; means for deriving electrical signals from the exposure light directed through said transparency to said record element; and means for deriving modulation signals in accordance with both said color corrected signals and said exposure light signals and for applying said modulation signals to said light modulating means to control the modulation of said exposure light.

References Cited in the file of this patent

UNITED STATES PATENTS

| | | |
|---|---|---|
| 2,214,072 | Biedermann | Sept. 10, 1940 |
| 2,253,086 | Murray | Aug. 19, 1941 |
| 2,309,048 | Curry | Jan. 19, 1943 |
| 2,313,542 | Hall | Mar. 9, 1943 |
| 2,434,561 | Hardy | Jan. 13, 1948 |
| 2,480,425 | Simmon | Aug. 30, 1949 |
| 2,606,245 | Hall | Aug. 5, 1952 |

UNITED STATES PATENT OFFICE
Certificate of Correction

Patent No. 2,808,453 October 1, 1957

Harold E. Haynes

It is hereby certified that error appears in the printed specification of the above numbered patent requiring correction and that the said Letters Patent should read as corrected below.

Column 2, line 10, after the syllable "sponding" insert —spots in the corrected—; column 5, line 36, for "$K_RR+K_G+K_BB$" read —$K_RR+K_GG+K_BB$—; column 8, line 73, after "amplifying" insert —means—.

Signed and sealed this 23rd day of September 1958.

[SEAL]

Attest:
KARL H. AXLINE,
*Attesting Officer.*

ROBERT C. WATSON,
*Commissioner of Patents.*